(12) United States Patent
Laverman et al.

(10) Patent No.: US 7,603,733 B2
(45) Date of Patent: Oct. 20, 2009

(54) DOCK LEVELLER, LIP FOR DOCK LEVELLER AND LIP HINGE CONSTRUCTION

(75) Inventors: Wybe Laverman, Beetgum (NL); Jan Berends, Buitenpost (NL)

(73) Assignee: Stertil B.V., Kootstertille (NL)

( * ) Notice: Subject to any disclaimer, the term of this patent is extended or adjusted under 35 U.S.C. 154(b) by 281 days.

(21) Appl. No.: 10/533,001

(22) PCT Filed: Oct. 29, 2003

(86) PCT No.: PCT/NL03/00737

§ 371 (c)(1),
(2), (4) Date: Dec. 15, 2005

(87) PCT Pub. No.: WO2004/039710

PCT Pub. Date: May 13, 2004

(65) Prior Publication Data

US 2006/0150348 A1    Jul. 13, 2006

(30) Foreign Application Priority Data

Oct. 29, 2002   (NL) .................................... 1021772

(51) Int. Cl.
*E01D 1/00* (2006.01)
(52) U.S. Cl. ...................................... 14/71.3
(58) Field of Classification Search .................. 14/69.5, 14/71.1, 71.3, 71.4
See application file for complete search history.

(56) References Cited

U.S. PATENT DOCUMENTS

| | | | | |
|---|---|---|---|---|
| 2,714,735 A | * | 8/1955 | Watson ........................ | 14/71.7 |
| 3,327,335 A | * | 6/1967 | Beckwith et al. ............. | 14/71.3 |
| 3,444,574 A | * | 5/1969 | Le Clear ...................... | 14/71.3 |
| 3,460,175 A | * | 8/1969 | Beckwith et al. ............. | 14/71.3 |
| 3,475,778 A | * | 11/1969 | Hovestad et al. ............. | 14/71.3 |
| 3,997,932 A | * | 12/1976 | Artzberger ................... | 14/71.3 |
| RE30,250 E | * | 4/1980 | Catlett ........................ | 14/71.3 |
| 4,402,100 A | * | 9/1983 | Slusar ......................... | 14/71.3 |
| 4,619,008 A | * | 10/1986 | Kovach et al. ............... | 14/71.7 |
| 4,827,549 A | * | 5/1989 | Walker ........................ | 14/71.7 |
| 4,937,906 A | * | 7/1990 | Alexander ................... | 14/71.1 |
| 5,205,010 A | * | 4/1993 | Hageman ..................... | 14/71.7 |

(Continued)

FOREIGN PATENT DOCUMENTS

FR    1.487.436    5/1967

(Continued)

*Primary Examiner*—Gary S Hartmann
(74) *Attorney, Agent, or Firm*—Michaelson & Associates; Peter L. Michaelson; Peter A. Luccarelli, Jr.

(57) ABSTRACT

A dock leveller, comprising a deck plate having a deck upper surface, which deck plate is pivotably connectable with a platform; a lip having a lip upper surface, which lip upper surface, with the deck upper surface, forms at least a part of a transport surface; and a lip hinge construction with a pivot element which pivotably connects an end of the lip and an end of the deck plate of the dock leveller, characterized in that the upper surface of the lip, through the pivot element, is placeable at a positive angle or a negative angle relative to a position in line with the upper surface of the deck, being pivotable to both one side and the other side.

7 Claims, 7 Drawing Sheets

U.S. PATENT DOCUMENTS 5,832,554 A * 11/1998 Alexander .................. 14/71.1
6,163,913 A * 12/2000 DiSieno et al. .............. 14/71.3
7,213,285 B2 * 5/2007 Mitchell ..................... 14/69.5
7,216,391 B2 * 5/2007 Muhl et al. ................. 14/71.1
2002/0124491 A1 * 9/2002 Hahn et al. .................. 52/174

FOREIGN PATENT DOCUMENTS

NL            1018210        12/2002

* cited by examiner

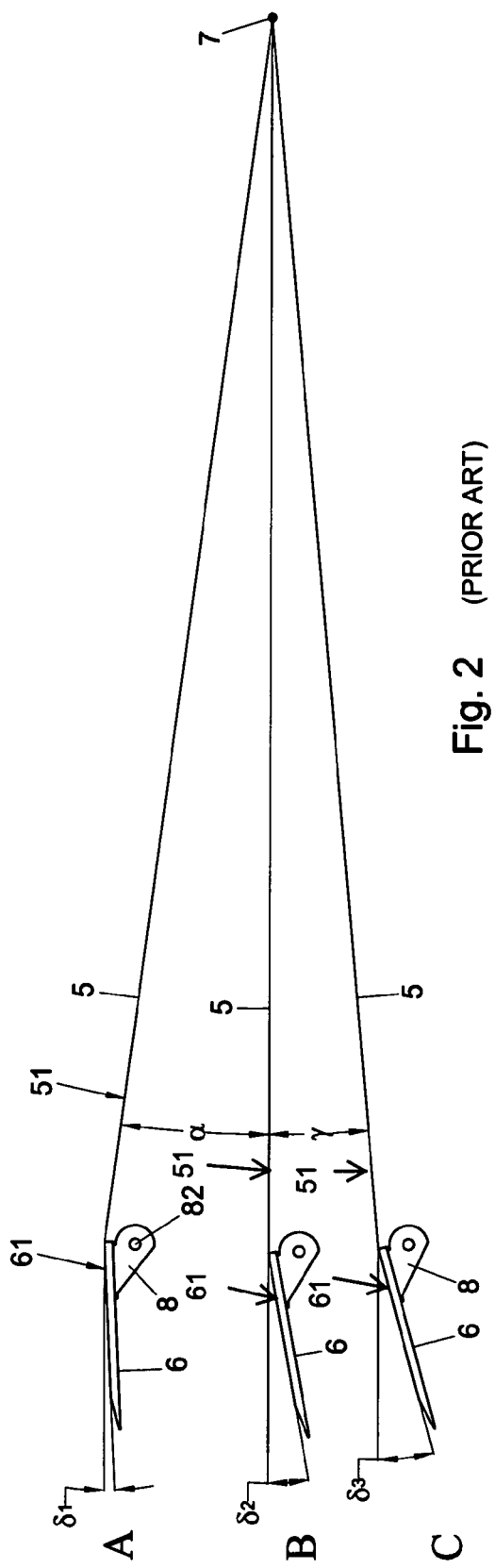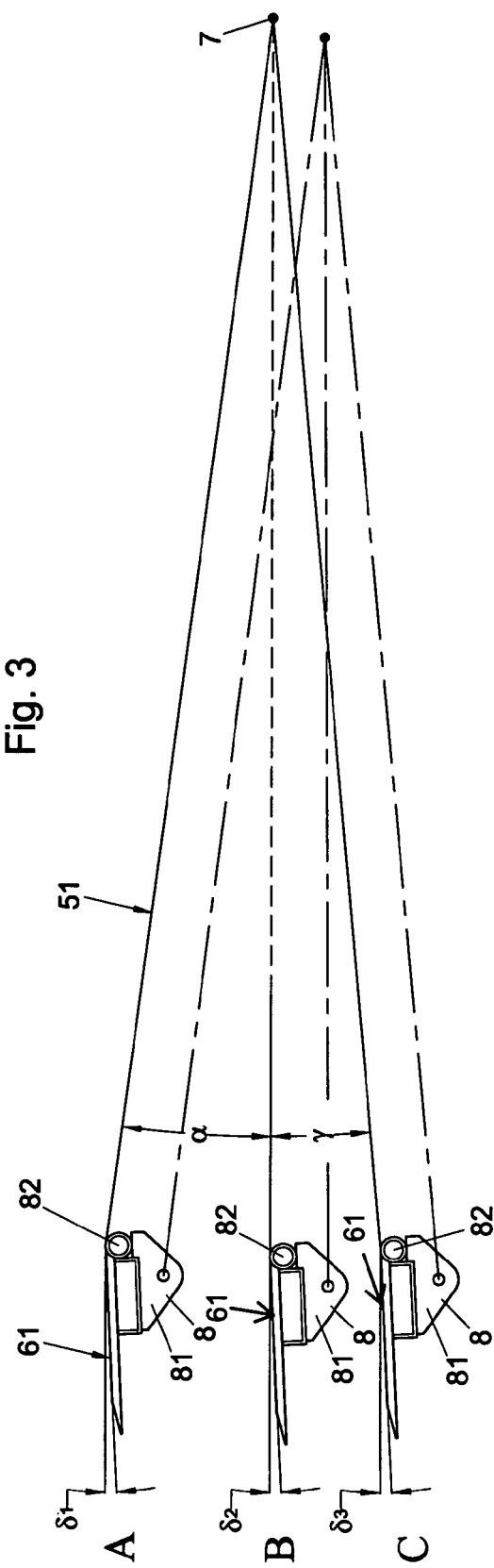
Fig. 2 (PRIOR ART)
Fig. 3

DOCK LEVELLER, LIP FOR DOCK LEVELLER AND LIP HINGE CONSTRUCTION

BACKGROUND OF THE INVENTION

1. Field of the Invention

The invention relates to a dock leveller and more particularly to a lip and a lip hinge construction for use in a dock leveller.

2. Description of the Prior Art

A dock leveller is known from practice. A dock leveller is intended to bridge a distance between a platform and a loading floor of, e.g., a truck. The known dock leveller comprises a deck plate which is rotatably connected with the platform through an extension hinge. Through a lip hinge construction, a lip is rotatably connected with the deck plate, so that a distance between the deck plate and the loading floor can be bridged. The upper surface of the lip and the upper surface of the deck plate then form a transport path for goods that are brought from the loading floor to the platform or vice versa.

However, the known dock leveller has the disadvantage of entailing a high ergonomic load, because in use much noise is produced by the known dock leveller, and the user is physically heavily loaded by vibrations. This is because when loading and unloading, a wheeled transport means, such as a rolling container, pallet truck and the like, is wheeled over the lip and the deck to the platform and vice versa. While wheeling such transport means in this path, vibrations arise in both the transport means and the dock leveller. As a result, under some circumstances, much noise is generated, which may be experienced as being objectionable by those working in the surroundings. Moreover, the vibrations are transmitted to the body of persons moving the transport means, which constitutes a heavy physical load.

SUMMARY OF THE INVENTION

It is an object of the invention to provide a dock leveller that generates less of an ergonomic load during use than heretofore through conventional arrangements.

It has been found that, in the use of a dock leveller, a disproportionate part of the ergonomic load is generated when the wheeled transport means is bridging a difference in height between the lip and the loading floor of the truck or the like. With a hinge construction according to the invention, the lip can be pivoted such that it can be held substantially parallel to, or in any case at a small angle relative to, the loading floor, substantially independently of the position of the deck, so that between the end of the lip and the loading floor there is substantially no, or in any case a small, difference in height. As there is no, or in any case a small, difference in height, surprisingly little noise is produced with a hinge construction according to the invention. Moreover, with a dock leveller according to the invention, the physical loading of a person who moves the transport means over the transport path is low, because the transport means transmits fewer vibrations to the person, since fewer vibrations are produced. Also vehicles that have a small tolerance as regards the height differences to be bridged (this tolerance is sometimes referred to as 'ground clearance') can be used advantageously with dock levellers according to the invention. Such vehicles can be, for instance, long electric pallet trucks or container carts.

The invention further relates to a lip and a lip hinge construction for a dock leveller. With such a lip and/or lip hinge construction, the ergonomic load in use can also be reduced in existing dock levellers, in that the use of a lip hinge construction according to the invention allows the lip to be pivoted into a position which more parallel to the loading floor than through conventional arrangements.

BRIEF DESCRIPTION OF THE DRAWINGS

Further details, aspects and examples of embodiments of the invention will be described hereinbelow with reference to the figures represented in the drawing.

FIG. 2 schematically shows a side view of a dock leveller with a lip hinge as known from the prior art, in different positions.

FIG. 3 schematically shows, in side view, an example of a dock leveller provided with a lip hinge construction according to the invention, in different positions.

DETAILED DESCRIPTION

Figure 1:
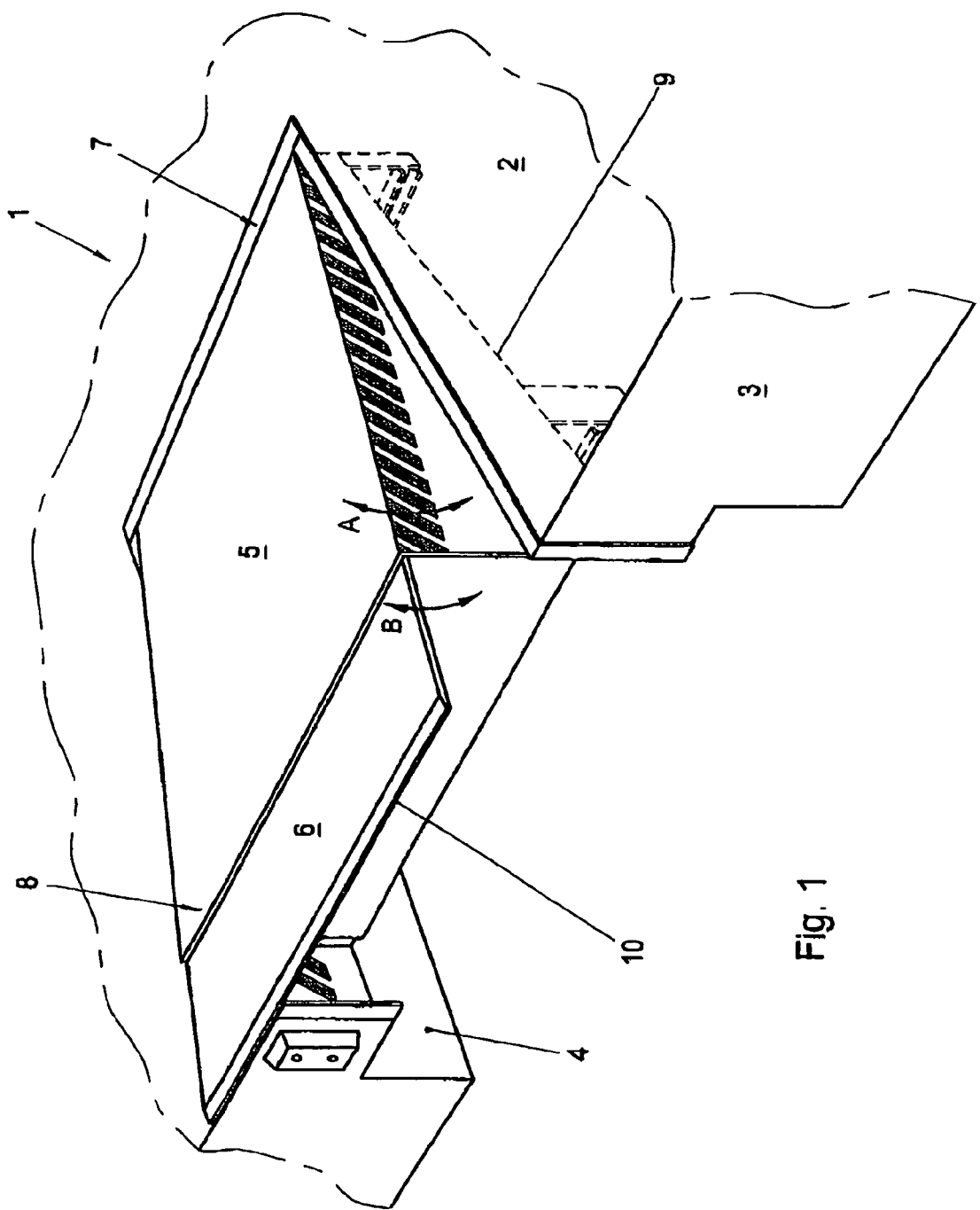
FIG. 1 schematically shows a perspective view of an example of a dock leveller.

In FIG. 1, there is shown an example of a dock leveller 1. Such a dock leveller is used to obtain a flowing transition between a loading floor of a transport vehicle, such as, for instance, a truck or a train, arranged opposite the dock leveller, and a platform 2 in which the dock leveller is arranged. The platform 2 has an upstanding edge 3, as a result of which the platform level is situated above the road surface or rail track. The dock leveller 1 sits in a recess 4 in the platform 2. The dock leveller has a deck 5 and a lip 6. By means of a hinge construction 7, sometimes called extension hinge, not shown in detail in FIG. 1, the deck 5 can pivot up and down relative to the platform 2 in the direction designated by an arrow A. By means of a lip hinge construction 8, indicated only roughly in FIG. 1, the lip 6 can pivot relative to the deck 5 in the direction designated by an arrow B. In this example, the dock leveller 1 is connected with the platform by means of a frame 9, represented in broken lines in FIG. 1. The deck 5 and the lip 6 can be moved by drives known per se, not shown in FIG. 1.

In use, for instance a truck is positioned with its back near the dock leveller, after which the deck 5 and the lip 6 are pivoted in the respective directions A and B, such that the front or free end 10 of the lip 6 rests on the loading floor of the truck. Any difference in height between the loading floor and the platform is thereby bridged. Next, the truck can be loaded and/or unloaded. Usually, for this purpose, wheeled transport means, such as, for instance, rolling containers and pallet trucks, are wheeled over the deck and the lip from the platform to the truck and vice versa.

FIG. 2 schematically shows an example of a known dock leveller in three positions A, B, C. The lip 6 is rotatable about a rotation axis 82 by means of the lip hinge construction 8.

The lip hinge construction 8 is then so designed that the lip upper surface 61 of the lip 6 always makes an angle with the deck upper surface 51 of the deck plate 5 that is greater than 180 degrees. This angle is determined by the highest workable position of the deck 5. This is because in that position the lip should lie at the least horizontally, or project slightly downwards, onto the loading floor to prevent accidents due to an upwardly projecting point of the lip. This means that in every position of the deck lower than the highest workable position, the angle at which the lip is disposed on the loading floor increases to an equal extent.

If the loading floor of the truck lies below the pivotal point (formed by the extension hinge 7 in FIG. 2) of the deck plate with respect to the platform, the deck upper surface 51, viewed from the extension hinge in the direction of the lip 6, points downwards, as shown in position C, or it is horizontal, as in position B. If the loading floor extends above the pivotal point, and hence above the platform, the deck upper surface 51 points upwards. Due to the limited rotation of the lip, the lip upper surface 61 always points down when the deck upper surface is horizontal or points down. As a result, the lip upper surface 61 is then steeper than the deck upper surface 51. In a known dock leveller such as it is manufactured by applicant, the lip upper surface makes an angle of at least 189.12 degrees with the deck upper surface. In position A, the deck upper surface points up and makes an angle $\alpha$ of 7.5 degrees with the horizontal plane. In position B, the deck upper surface is horizontal, while in position C the deck upper surface points downwards at an angle $\gamma$ of 4.58 degrees. In position A the lip upper surface is directed downwards at an angle $\delta 1$ of 1.62 degrees, while in positions B and C it points down at an angle $\delta 2$ and $\delta 3$ of 9.15 and 13.7 degrees, respectively.

FIG. 3 schematically shows an example of an embodiment of a dock leveller according to the invention in positions A, B, and C. As shown, the lip upper surface 61 can make both a positive and a negative angle with the deck upper surface 51. As a consequence, the lip upper surface 61, also when a deck upper surface points downwards, can be held in a more level position than the deck upper surface, and the difference in height between the front edge of the lip and the lip hinge construction can be kept small.

It has been found that it is precisely the transition between the leveller and a loading floor of, e.g., a truck that is largely determinative of the ergonomic load. Particularly the ride-on angle of the lip upper surface and the ride-on height largely influence the noise production and vibration of the transport means when it is being moved over the dock leveller. The noise and the vibrations that are produced by the transport means, e.g., the rolling container, surprisingly are reduced significantly by the small difference in height between the lip hinge construction and the front end of the lip. In particular, it has been found that the noise production is reduced by a factor of 10 if the lip upper surface points downwards at an angle of between 1.4 and 1.9 degrees compared to an angle of between 9 and 14 degrees.

In the example of FIG. 3, the dock leveller is positioned such that in position A the deck upper surface points up at an angle $\alpha$ of 7.51 degrees. In position B the deck upper surface is horizontal, while in position C the deck upper surface points down at an angle $\gamma$ of 4.63 degrees. The lip upper surface in position A is directed downwards at an angle $\delta 1$ of 1.47 degrees, while in positions B and C it points downwards at an angle $\delta 2$ and $\delta 3$ of 1.84 degrees and 1.79 degrees, respectively. It has been found that with such a combination of angles of the deck upper surface and the lip upper surface, the ergonomic load and in particular the noise production of the lip and the deck plate is very low.

Figure 4:
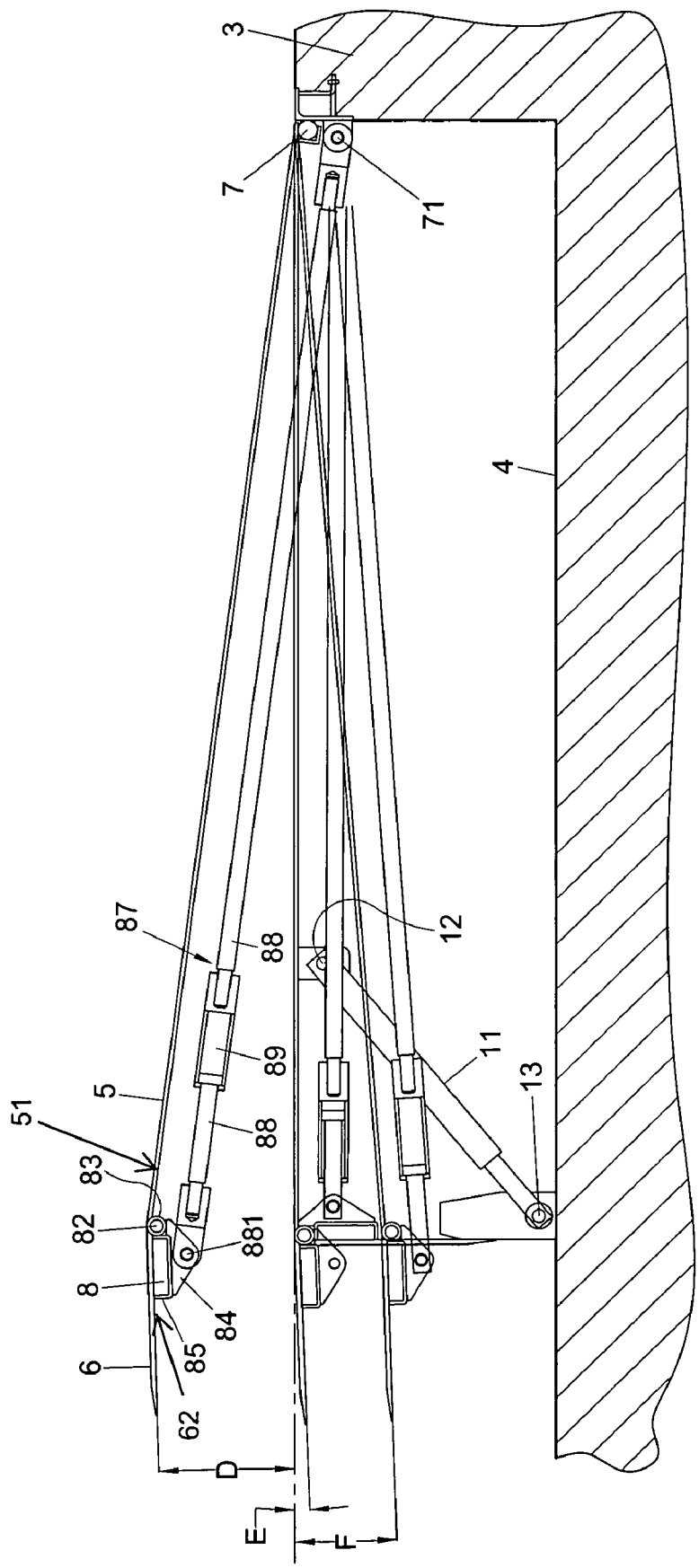
FIG. 4 shows a cutaway view of a dock leveller with an example of a lip hinge construction according to the invention.

FIG. 4 shows in more detail an example of an embodiment of a dock leveller according to the invention in positions D-F. In FIG. 4, the lip 6 is rotatable relative to the deck plate 5 about a rotation axis 82 by means of the lip hinge construction 8. The deck plate 5 is rotatably connected with the platform 3 by a hinge construction 7.

At the underside of the deck plate 5 extends a stiff element or transmission member 87, which, in the example shown, comprises a rod 88 provided with a pneumatic cylinder 89. The rod 88 can also comprise the piston rod of the pneumatic cylinder. Adjacent the rotation axis 82, the rod 88 is pivotably connected with the lip 6, as indicated at 881, and adjacent the extension hinge construction 7 it is pivotably connected with the platform 3, as indicated at 71. The rod 88 and the deck plate 5 constitute a so-called parallelogram construction, vertices of which are defined by the pivot axes of rotation indicated at 7, 71, 82 and 881, by which the rotation of the deck plate 5 and the lip 6 are coupled to each other. In the example shown, the lip and the deck plate are then coupled in such a manner that the lip upper surface, independently of the position of the deck upper surface 51, is at a substantially constant small angle with the horizontal plane.

With the pneumatic cylinder 89, the lip can be pivoted. In particular, the front edge 10 of the lip 6 can be pivoted downwards by having the piston rod of the pneumatic cylinder 89 move inwards, and the front edge can be pivoted upwards by moving the piston rod of the cylinder 89 outwards.

Arranged in the recess 4 in the platform 3 is a hydraulic cylinder 11, which is pivotably connected with the underside of the deck plate 5 and the bottom of the recess 4, so that the deck plate can be pivoted upwards and downwards.

Figure 5A:
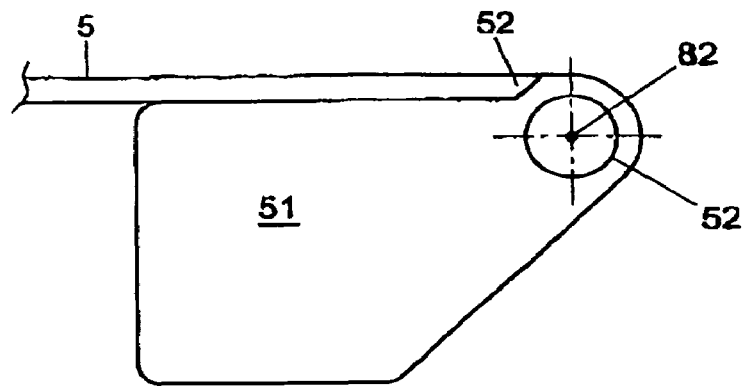
FIGS. 5a and 5b show side views of parts of a first example of a lip hinge construction according to the invention.
Figure 5B:
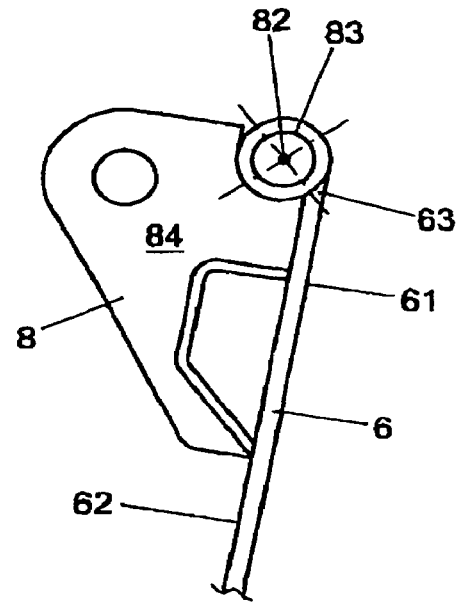
Figure 7:
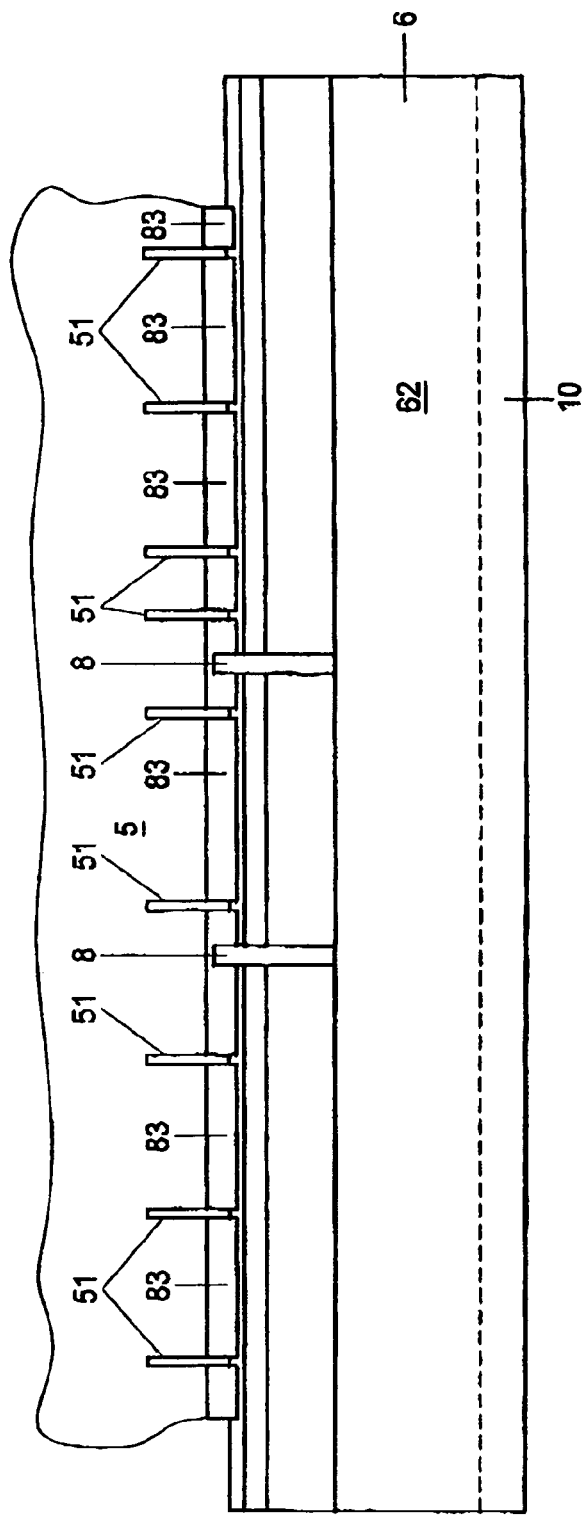
FIG. 7 schematically shows in bottom view an example of a lip for a dock leveller according to the invention.

In the example shown in FIG. 4, the lip hinge construction 8, as shown in more detail in FIGS. 5*a-b* and FIG. 7, comprises a cylinder- or rod-shaped element 83, whose longitudinal axis coincides with the rotation axis 82. In the example shown in FIGS. 5*a-b*, the rod-shaped element is designed as a sleeve 83. The sleeve or rod-shaped element 83, as can be seen in FIG. 5*b*, is fixed with respect to the lip by a flange 84 extending downwards from the lip, at the underside 62 of the lip. With respect to the deck plate 5, the sleeve 83 is fixed with flanges 511 mounted on the deck plate 5, which flanges 511, as shown in FIG. 7, abut against the end faces of the sleeve. The flanges 511 are provided with eyes 52, which align with the sleeve 83. In mounted condition, a rod extends through the sleeve(s) 83 and the eyes 52, so that the sleeves are held in position relative to the deck plate 5.

In the example of FIGS. 4, 5*a-b* and 7, the edge of the lip 6 and the edge of the deck plate 5 abut against the rod-shaped element 83, so that the lip upper surface 61 and the deck upper surface 51 are contiguous to the outer surface 831 of the cylinder- or rod-shaped element 83. As a result, the lip upper surface 61 and the deck upper surface 51 merge into each other uniformly and the noise production is reduced. To further improve a uniform transition, the lip 6 and the deck plate 5 are bevelled adjacent the rod-shaped element in the areas designated by 63 and 522, respectively, so that the lip 6 and the deck plate 5 can lie very close to the outer surface of the sleeve 83.

Figure 6:
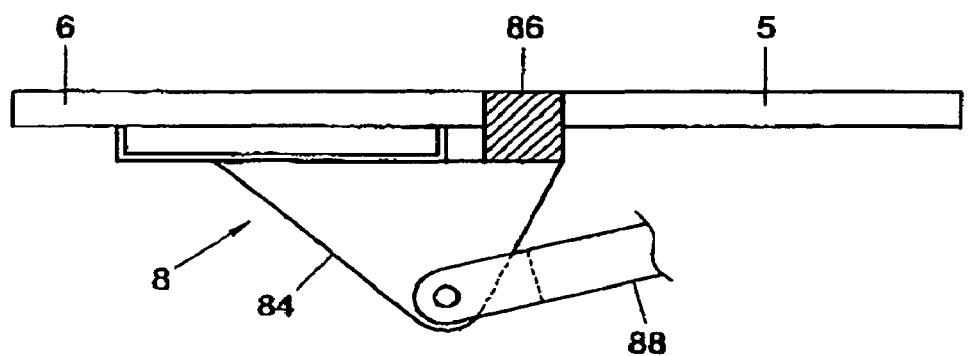
FIG. 6 schematically shows a second example of the inventive lip hinge construction.

In FIG. 6 another example of a lip hinge construction according to the invention is shown. Here, the cylinder-shaped element 83 has been replaced with a flexible hinge element 86, which is elastically deformable in the example shown. An upper surface of the flexible element 86 links up with the lip upper surface 61 and the deck upper surface 51. The flexible element 86 yields, in addition to a hinge action, a further reduction of the noise production. This effect is obtained not only in that the lip and deck upper surfaces 51 and 61, respectively, link up with the upper surface of the flexible element, but also in that vibrations generated in the lip or the deck plate are damped by the flexible element 86. The hinge element 86 may be manufactured, for instance, using plastic or rubber material or the like.

In use, during loading and unloading, a wheeled transport means, such as a rolling container, pallet truck and the like, is wheeled from the loading floor of the truck over the lip upper surface and the deck upper surface to the platform and vice versa. While wheeling the transport means in this path, under certain circumstances, considerable noise is generated, which may be experienced as objectionable by those working in the surroundings. Measurements have shown that in addition to the steepness of the lip, a factor causing a considerable part of the noise production is the wheels of, e.g., the rolling container, butting against the edge of the lip, which means that the height (thickness) of the edge of the lip influences the amount of noise produced. In particular, it was found that the use of a thinner edge yielded a surprising and disproportionately large reduction of the noise produced. By manufacturing the lip from high-strength steel, such as steel having a yield point greater than 600 $N/mm^2$ and preferably greater than 700 $N/mm^2$, the front edge of the lip, and also the whole lip, can be made of relatively thin design, without affecting the strength of the whole lip. In FIG. 7 an example of such a lip 6 is shown. The lip 6 is provided with ribs 62 on the edge 63 (see FIG. 5b) situated on the side of the lip hinge construction. The ribs 62 project partly beyond the edge 63 and are provided with a recess through which, in use, the rod-shaped element 83 of the lip hinge construction extends.

Figure 8:
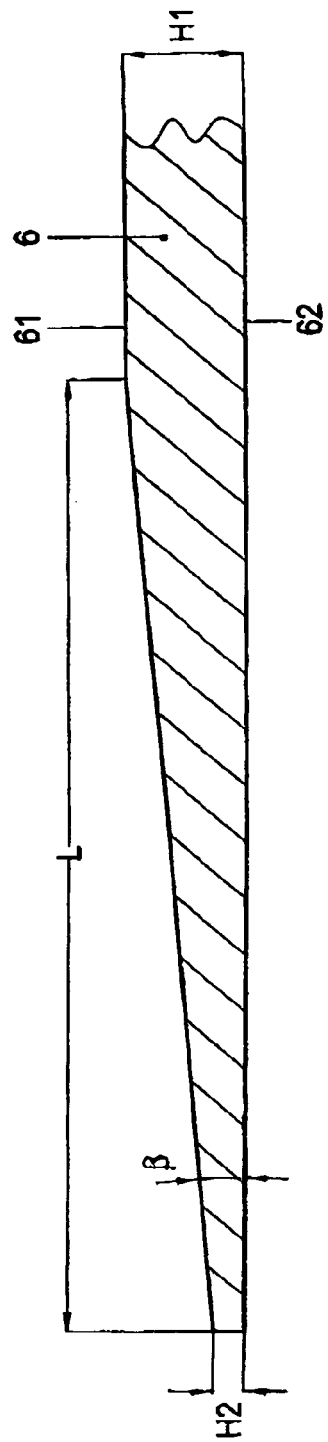
FIG. 8 schematically shows in cross section the front portion of a lip of a dock leveller according to the invention.

In FIG. 8 a cross section of the front edge 10 of the lip 6 in FIG. 7 is shown. The height H2 of the upstanding edge of the lip 6 is between 1.2 and 2.5 mm (approximately 0.05"-0.1"), and preferably between 1.5 and 1.9 mm (approximately 0.06"-0.08"). The thickness of the plate H1 is between 6 and 10 mm (approximately 0.25"-0.39"), and preferably between 7 and 9 mm (approximately 0.28"-0.35"). The inclination $\beta$ of the bevel between the upstanding edge and the full thickness of the plate is between 3° and 8°, preferably 4° and 5°. The length L of the inclination is preferably between 50 and 100 mm.

The surface of the lip can be made slip-resistant by providing it with an antislip layer in the form of a coating with an antislip filler, such as, for instance, twaron granules. This provides the advantage that the conventional, expensive surface treatment of rolling a tear profile can be omitted. Also, such a coating yields a surface roughness with a random distribution, so that less noise is produced. Moreover, as a result, the vibration of the transport means is reduced, so that the chance of injury to persons moving the transport means is reduced. Also, the deck upper surface may be provided with such an antislip layer.

It is to be noted that the measures mentioned in the foregoing passages can also be applied to a lip without the above-described lip hinge construction and the transmission member.

Figure 9:
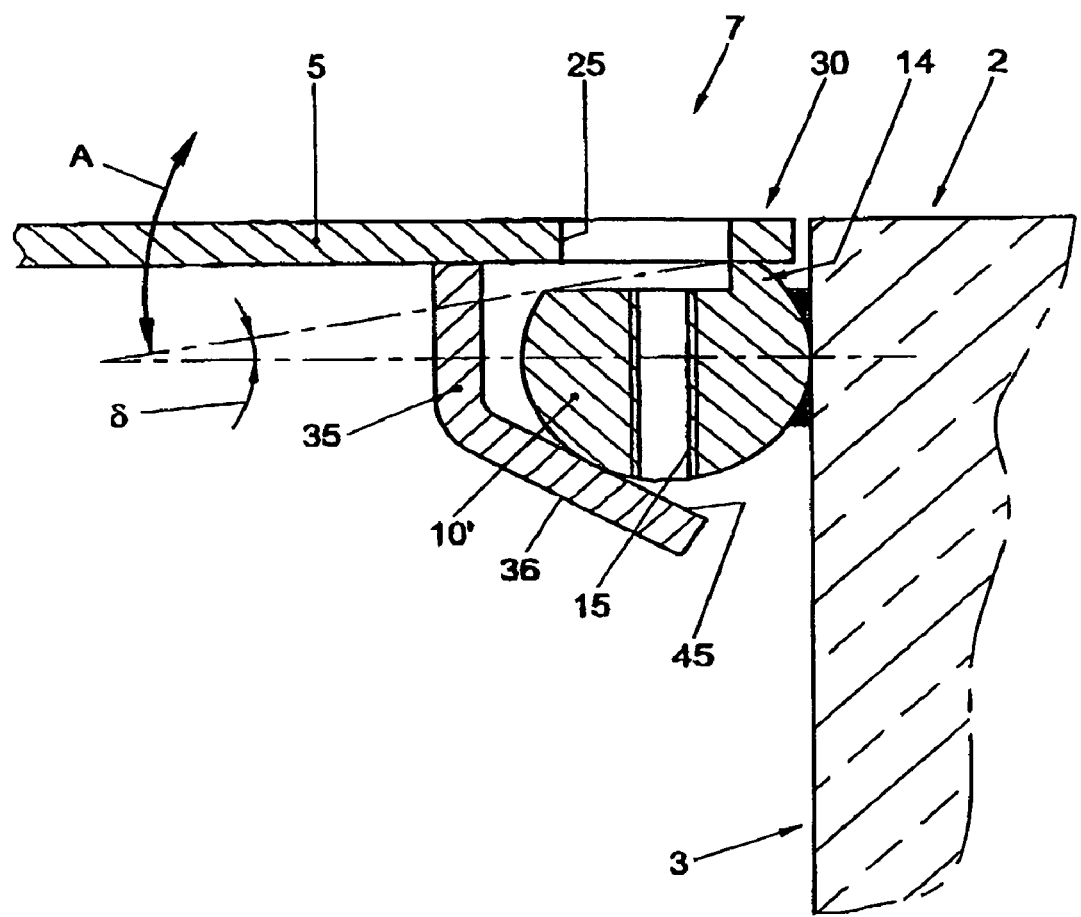
FIG. 9 schematically shows a hinge for a deck plate of a dock leveller according to the invention.

In a dock leveller according to the invention, one can use a low-noise extension hinge construction as is known from Dutch patent application 1018210 and the dock levellers manufactured by the applicant. In FIG. 9 a cross section of an example of such a hinge construction 7 is shown. The hinge construction comprises an elongated rod 10 or the like, in this example having a substantially circular cross section, which is mounted on the platform 2 along the rear edge of the opening 4. The rod 10 can be connected with the platform in any desired manner, for instance by interposition of a frame or section. The rod 10 is provided with an upstanding edge 14, which extends along the length of the rod 10. Incidentally, the edge 14 may also be locally interrupted. In mounted condition of the rod, the edge 14 is situated near the platform edge 2.

The deck 5 is connected with the hinge construction in the following manner. The rear edge 30 of the deck 5 rests on the edge 14. Further, the deck 5 is provided, at the underside thereof, with a section 35 approximately L-shaped in cross section, which extends along the edge 30, the longitudinal edge of one of the legs of the L-shape being connected with the deck 5. The legs of the section 35 are arranged at an obtuse angle relative to each other, so that the leg 36 remote from the deck 5 makes an angle with the plane of the deck 5. The side of the leg 36 in mounted condition facing the rod 10 forms a sliding surface 45, which, in mounted condition as shown in FIG. 9, abuts against the rod 10.

Provided in the rod 10 are threaded openings 15, into which pegs can be turned. These pegs engage in corresponding openings 25 in the deck 5. Thus, the horizontal movement of the deck 5 is limited.

In use, the deck 5 is pivoted in the direction A, with an extreme lower position in which the deck includes an angle $\delta$ with the horizontal plane. The hinge point of the deck 5 is defined by the edge 14 on which the edge 30 rests, the edge 14 thus forming a rotation element. The path of the pivoting deck 5 is guided by the contact between the sliding surface 45 and the rod 10. The combination of the sliding surface 45 and the rod 10 forms a guide structure for guiding the deck during pivotal movement. The rod 10 here forms a first sliding surface, which is connected with the platform edge, and the sliding surface 45 forms a second sliding surface, which is connected with the deck 5. In mounted condition, the surfaces are in mutual abutment, and during pivotal movement they slide over each other. By adjusting the contour of the sliding surface 45, for instance by using one or more straight parts, a different path of the deck 5 during pivoting can be obtained in a simple manner.

Due to the edge 30 of the deck resting on the rotation element in the form of the edge 14, which is located against or near the platform edge, the hinge point of the deck 5 is situated close to the platform edge. Consequently, there is in each case a minimal difference in height between deck and platform, which is comparatively independent of the position of the deck. In addition, the intermediate space between deck and platform is also comparatively small. Due to the small difference in height, little noise is produced during use.

In the example shown in FIG. 4, the lip is pivoted relative to the deck plate with a parallel construction provided with a pneumatic cylinder. Through this construction, a positioning mechanism for the lip is formed, whereby, in use, first the lip is extended and next, by means of the parallel construction, held in position relative to the deck plate. However, it is also possible, as shown in FIGS. 10-12, to use separate means for extending and positioning the lip.

Figure 10:
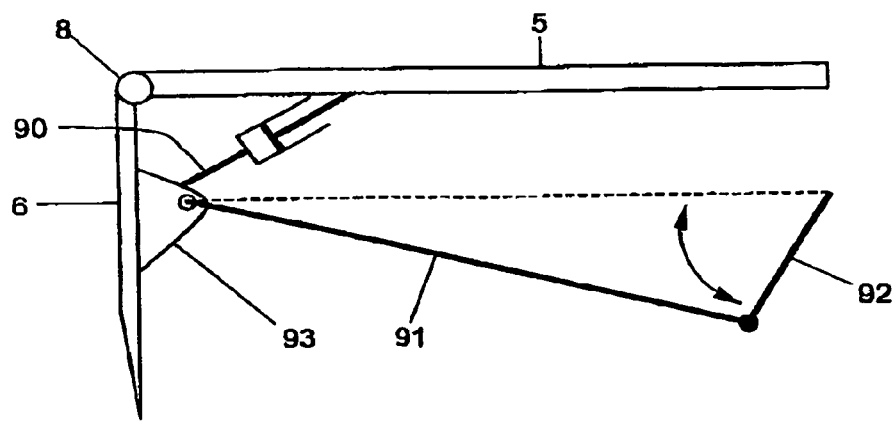
FIGS. 10-12 schematically show side views of examples of dock levellers with a lip hinge construction according to the invention.
Figure 11:
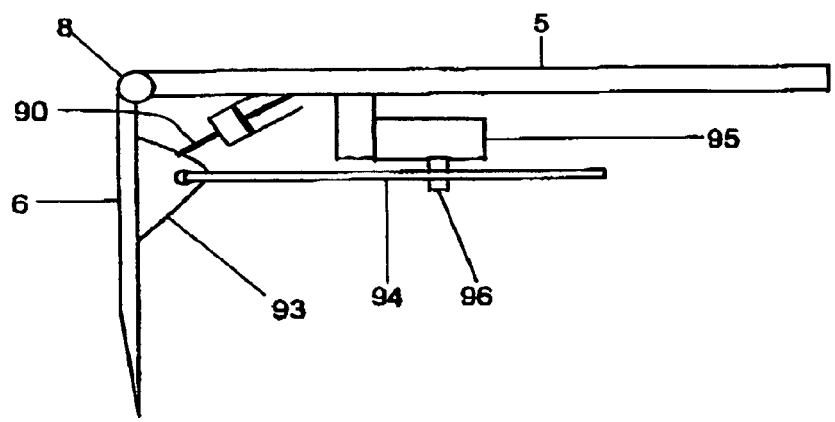
Figure 12:
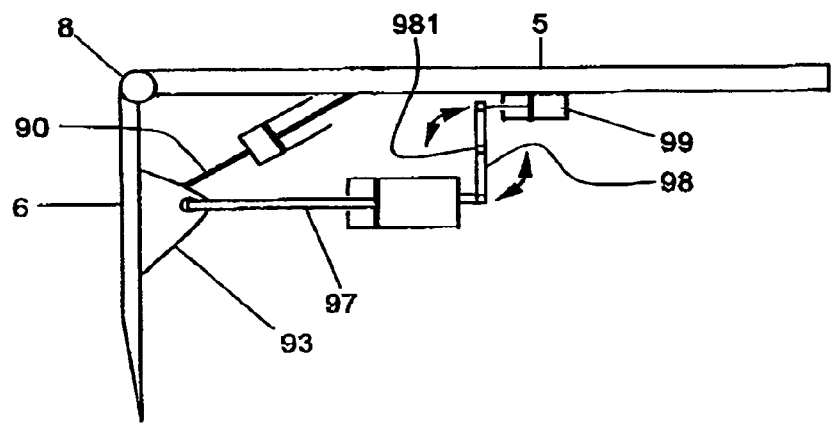

In FIGS. 10-12, for extending purposes, a hydraulic cylinder 90 is used. In FIG. 10, a linkage 91, 92, which is pivotably connected with the lip on a flange 93, forms, upon extension, a parallel construction, which keeps the lip in the desired position. If the lip is folded back after use, the linkage 91, 92 pivots back into the position shown in FIG. 10, e.g., by removing the pressure from the cylinder 90.

In the example of FIG. 11, after extension with the aid of the cylinder 90, the position of the lip is controlled by an adjusting motor 95 with a nut 96 engaging a thread of a rod 94. The rod is rotatably connected with a flange 93 at the underside of the lip 6. The motor 95 can move the rod by way of the thread and the nut 96, against the action of the cylinder, so that the position of the lip 6 can be controlled.

In FIG. 12, the lip 6, after being extended, is held in position through a cylinder 99 which engages a lever 98. The lever can rotate about an axis 981 and by one end move a cylinder 97, so that the position of the lip can be adjusted. The cylinder 99 can, for instance, be controlled by a measuring device, not shown, which senses the position of the lip.

The invention is not limited to the examples described hereinabove, but after reading the foregoing, different variants will be obvious to those skilled in the art, without deviating from the protection laid down in the claims. In particular, it is obvious to design the lip hinge construction as, for instance, a simple piano hinge of suitable strength which can hinge in two directions. Further, instead of a pneumatic cylinder, a hydraulic cylinder, a screw jack or a differently extensible rod can be used.

Also, the lip upper surface may slope from the deck towards a front end of the lip and in operation be held at a small angle relative to the platform, which angle may be, for instance, less than 5 degrees, such as less than 2 degrees and in particular the small angle can be 1 degree. As a result, if the lip is loaded, it will become level due to elastic stretch of the lip under loading.

Further, the angle of the lip upper surface may be coupled to a position of the deck plate and operatively increase according as the deck plate, viewed from the platform, points down more. Thus the height range and a more uniform transition between platform and loading floor is obtained.

The invention claimed is:

1. A dock leveller comprising:
   a frame having an extension hinge for pivotal movement along a first axis and a first pivot connection defining a second axis, the respective axes oriented at a first spacing there between;
   a deck coupled to the extension hinge having a deck plate with a deck upper surface;
   a lip having a lip upper surface, the lip upper surface and the deck upper surface forming a least a part of a transport path;
   a lip hinge coupled to the lip and the deck for relative pivotal movement of the respective lip and deck upper surfaces along a third axis that is oriented a second spacing from the first axis;
   a second pivot connection operatively coupled to the lip and defining a fourth axis that is oriented with respect to the lip hinge third axis identical to the first spacing; and
   a transmission member pivotally coupled to the first and second pivot connections, establishing an operable spacing between the second and fourth axes that is identical to the second spacing in at least one mode of operation, so that the four respective axes define vertices of a parallelogram.

2. The dock leveller recited in claim 1 wherein the maximum overall relative pivoting range of the respective lip and deck upper surfaces is approximately 14 degrees.

3. The dock leveller of claim 1, wherein the deck upper surface operative pivoting range relative to the platform is no more than approximately 7.5 degrees.

4. The dock leveller recited in claim 1 wherein the stiff element comprises a variable length element.

5. The dock leveller recited in claim 4 wherein the variable length element comprises a pressurized fluid cylinder.

6. The dock leveller recited in claim 1 wherein the lip hinge comprises an elastically deformable material.

7. The dock leveller recited in claim 1 wherein the extension hinge comprises an elastically deformable material.

* * * * *